United States Patent
Maria

(10) Patent No.: US 9,985,881 B2
(45) Date of Patent: *May 29, 2018

(54) APPARATUS AND METHOD FOR ACCESSING A BACK-END SERVICE

(71) Applicant: AT&T MOBILITY II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/434,219

(22) Filed: Feb. 16, 2017

(65) Prior Publication Data

US 2017/0163529 A1  Jun. 8, 2017

Related U.S. Application Data

(63) Continuation of application No. 14/499,967, filed on Sep. 29, 2014, now Pat. No. 9,609,574.

(51) Int. Cl.
*H04L 12/715* (2013.01)
*H04W 4/14* (2009.01)
(Continued)

(52) U.S. Cl.
CPC ............ *H04L 45/64* (2013.01); *H04W 4/14* (2013.01); *H04W 76/02* (2013.01); *H04W 84/042* (2013.01); *H04W 88/16* (2013.01)

(58) Field of Classification Search
CPC ........ H04L 45/64; H04W 4/14; H04W 76/02; H04W 84/042; H04W 88/16
(Continued)

(56) References Cited

U.S. PATENT DOCUMENTS 8,438,631 B1  5/2013  Taylor et al.
8,494,560 B2  7/2013  Parker
(Continued)

OTHER PUBLICATIONS

Braun, et al., "Software-Defined Networking Using OpenFlow: Protocols, Applications and Architectural Design Choices." Future Internet 6.2 (2014): 302-336.
(Continued)

*Primary Examiner* — Mark H Rinehart
*Assistant Examiner* — Kokou R Detse
(74) *Attorney, Agent, or Firm* — Guntin & Gust, PLC; Robert Gingher

(57) ABSTRACT

Aspects of the subject disclosure may include, for example, a first network element in local communication with a gateway of a core network portion of a mobility network. Establishment of a first logical network connection is facilitated between the first network element and a second network element in local communication with a remotely accessible system, such as a back-end system of an enterprise data center or cloud service provider. A request from a mobile device serviced by the mobility network is detected for access to a service of the remotely accessible system. The request and/or a translation of the request is forwarded to the second network element by way of the first logical network connection. The second network element forwards the translated request to the remotely accessible system. Other embodiments are disclosed.

20 Claims, 7 Drawing Sheets

(51) Int. Cl.
*H04W 76/02* (2009.01)
*H04W 88/16* (2009.01)
*H04W 84/04* (2009.01)

(58) Field of Classification Search
USPC .......................................................... 370/254
See application file for complete search history.

(56) References Cited

U.S. PATENT DOCUMENTS

| | | |
|---|---|---|
| 8,718,632 B2 | 5/2014 | DiMeo et al. |
| 8,750,108 B2 | 6/2014 | Laudermilch et al. |
| 9,240,949 B2 | 1/2016 | McMurry et al. |
| 9,609,574 B2 * | 3/2017 | Maria .................. H04W 40/24 |
| 2013/0268646 A1 | 10/2013 | Doron et al. |
| 2014/0052877 A1 | 2/2014 | Mao |
| 2014/0177533 A1 | 6/2014 | Xue et al. |
| 2015/0036505 A1 | 2/2015 | Sparks et al. |
| 2016/0072762 A1 | 3/2016 | Liang et al. |

OTHER PUBLICATIONS

Jammal, M. et al., "Software-Defined Networking: State of the Art and Research Challenges." arXiv preprint arXiv:1406.0124 (2014).
Mendonca, M. et al., "A Survey of software-defined networking: past, present, and future of programmable networks." hal-00825087 (2013).
Vahlenkamp, M. et al., "Enabling Information Centric Networking in IP Networks Using SDN." Future Networks and Services (SDN4FNS), 2013 IEEE SDN for. IEEE, 2013.

* cited by examiner

300

APPARATUS AND METHOD FOR ACCESSING A BACK-END SERVICE

CROSS-REFERENCE TO RELATED APPLICATIONS

This application is a Continuation of and claims priority to U.S. patent application Ser. No. 14/499,967, filed Sep. 29, 2014. The contents of the foregoing is hereby incorporated by reference into this application as if set forth herein in full.

FIELD OF THE DISCLOSURE

The subject disclosure relates to an apparatus and method for accessing a back-end service, and more particularly to a backend-as-a-service, software defined network element.

BACKGROUND

Mobile devices which require access to enterprise back-end data sources generally rely on middleware servers, such as Mobile Enterprise Applications Platforms (MEAP) or Mobile Applications Development Platforms (MADP) to provide this information. For example, a mobile application can be written to request financial transactions from an Oracle Financial database residing in an enterprise datacenter. In this example, the mobile device application issues data requests to a Mobile Enterprise Applications Platform (MEAP) or Mobile Applications Development Platform (MADP) middleware gateway and/or server residing in the enterprise data center, which subsequently accesses backend data sources, e.g., databases, and forwards this data to the mobile application.

In other words, when an application residing on a mobile device requires access to a database, e.g., an Oracle database residing in the enterprise data center, the mobile application interfaces with a middleware server. These servers are known by various acronyms, such as, Mobile Enterprise Applications Platforms (MEAP) or Mobile Applications Development Platforms (MADP).

MEAP and/or MADP gateways can be resident at datacenters of the enterprise organizations and generally receive data from a mobile device by way of the mobile network. In an LTE environment, the MEAP/MADP gateways receive the data from an LTE gateway. The MEAP/MADP gateway residing in the enterprise premises accesses backend data sources, such as Oracle databases, and forward the information requested back to the LTE gateway for delivery to the mobile device. Thus, the LTE gateway residing in the carrier network essentially passes data back and forth between the mobile device and the MEAP/MADP servers.

BRIEF DESCRIPTION OF THE DRAWINGS

Reference will now be made to the accompanying drawings, which are not necessarily drawn to scale, and wherein.

DETAILED DESCRIPTION

Figure 1:
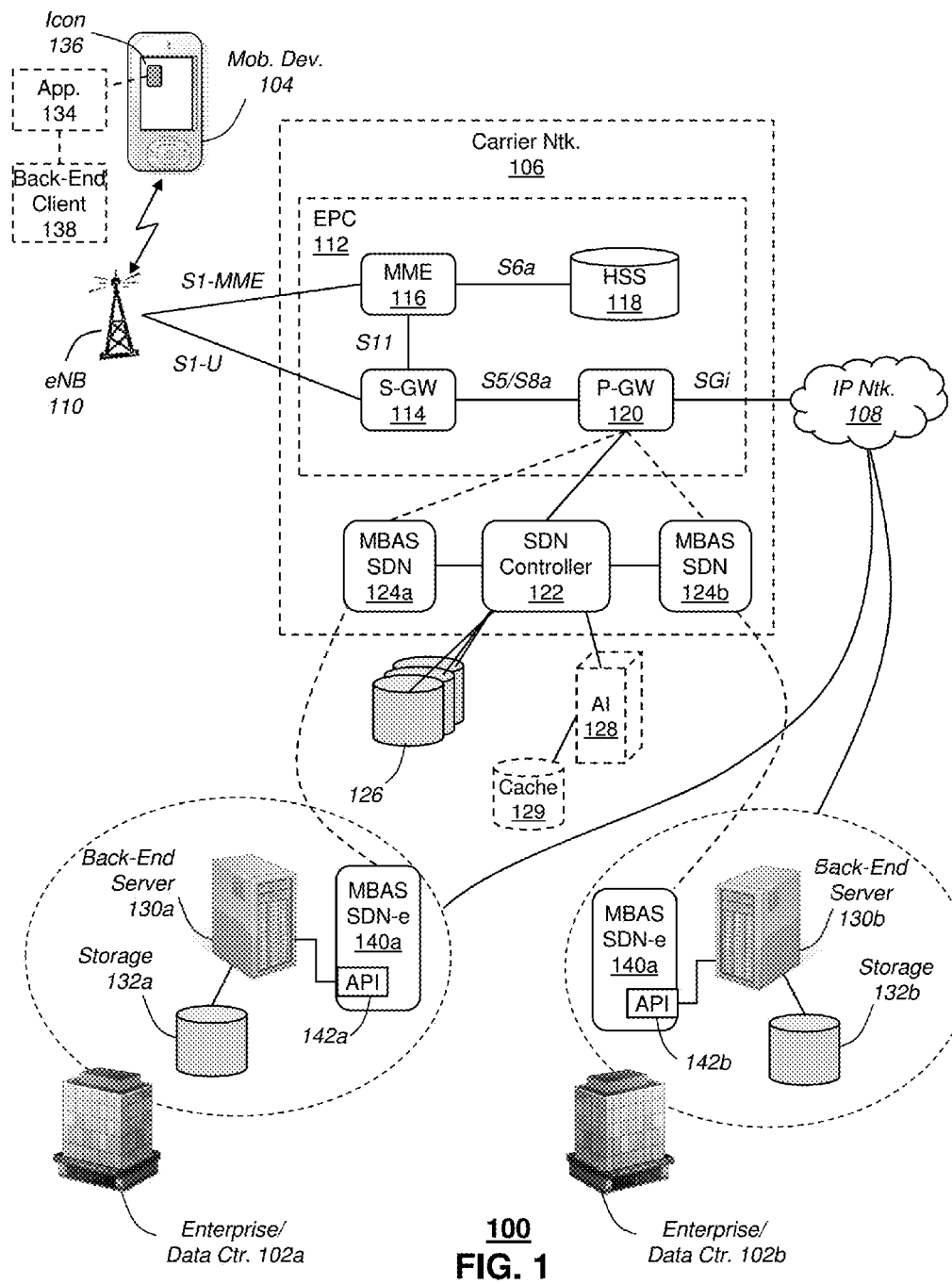
FIG. 1 depicts an illustrative embodiment of a communication system that provides a backend-as-a-service, software defined network element.

The subject disclosure describes, among other things, illustrative embodiments of software defined network element front-ending a gateway of the core network provides mobile devices with an ability to access back-end data sources residing in the cloud and in enterprise customer data centers. Mobile clients accesses services provided by a software-defined network, mobile backend-as-a-service network element that subsequently interfaces with a corresponding software-defined network, mobile backend-as-a-service element residing in the cloud or enterprise customer data center containing backend services. Other embodiments are described in the subject disclosure.

The carrier is disintermediated from this process—it is just passing data back and forth from and to the mobile device. One or more aspects of the subject disclosure include software-defined network, mobile backend-as-a-service network element that allow mobile devices to dynamically access back-end data sources (such as Oracle and SAP databases) residing in the cloud or enterprise customer data centers without mobile middleware servers. In some instances, mobile devices can access the back-end data sources without requiring a resident back-end client, or even a related application. Namely, requests for back-end services can be made through existing messaging infrastructures, such as short message service (SMS) or Mobile Multimedia Messages (MMS) according to the techniques disclosed herein.

One embodiment of the subject disclosure includes a device including a processor and a memory that stores executable instructions. The executable instructions, when executed by the processor, facilitate performance of operations that include creating a first software defined network element in local communication with a gateway of an evolved packet core of a long-term evolution network. Establishment of a first logical network connection is facilitated between the first software defined network element and a second software defined network element in local communication with a remotely accessible system. A request initiated by a mobile device serviced by the long-term evolution network is received for access to a service of the remotely accessible system. The request is translated and forwarding to the second software defined network element by way of the first logical network connection. The second software defined network element forwards the translated request to the remotely accessible system.

Another embodiment of the subject disclosure includes a machine-readable storage medium, including executable instructions that, when executed by a processor, facilitate performance of operations. The operations including creating a first software defined network element in local communication with equipment of a core network of a mobility network. Establishment of a first logical network connection is facilitated between the first software defined network element and a second software defined network element in local communication with a remotely accessible system. A first message is received including a request initiated by a mobile device serviced by the mobility network for access to a service of the remotely accessible system. A second message is forwarded including the request to the second software defined network element by way of the first logical network connection. The second software defined network element forwards the second message to the remotely accessible system by way of an application programming interface.

Yet another embodiment of the subject disclosure includes a process, including creating, by a system including a processor, a number of software defined network elements at a network carrier premises. Establishment of number of logical network connection are facilitated by the system between the number of software defined network elements and a number of network elements in local communication with a number of back-end servers at enterprise premises. A request initiated by a mobile device is received by the system for access to a service of a particular back-end server of the number of back end servers. A location is identified of the particular back-end server of the number of back-end servers, and forwarded by the system to the network element. The message is forwarded by way of a logical network connection of the number of logical network connections corresponding to the location of the particular back-end server. The network element forwards the request to the particular back-end server of the number of back-end servers.

FIG. 1 depicts an illustrative embodiment of a communication system 100 that provides a backend-as-a-service, software defined network element. The system 100 supports mobile access to remote, back-end services hosted by data centers 102a, 102b (generally 102). A mobile device 104 accesses the back-end services by way of a network infrastructure. In the illustrative example, the network infrastructure includes a carrier network 106 in communication with the data centers 102 by way of an internet protocol (IP) network 108. The mobile device 104 accesses the carrier network 106 by way of a radio terminal, such as an enhanced Node B (eNB) 110.

The carrier network 106 includes a core network, such as an Enhanced Packet Core (EPC) 112 of a 4G or Long-Term Evolution (LTE) network. The EPC or core network 112 includes one or more network elements. For LTE networks, the core network 112 generally includes a Serving Gateway (S-GW) 114, a Mobility Management Entity (MME) 116, a Home Subscriber Server (HSS) 118 and a Packet Data Network (PDN) Gateway (P-GW) 120 as shown. The core network gateways 114, 116, 118 and 120 are in communication with each according to pre-defined interfaces S11, S6a, S5/S8a, as shown.

The eNB 110 is in communication with the MME 116 through an S1-MME interface and the S-GW 114 through an S1-U interface. Generally, the MME handles control plane activity, whereas the S-GW handles data or user plane activity. Information packets are routed between the P-GW 120 and one or more other networks, such as the IP network 108, an ISM network and/or GSM network (not shown).

In some embodiments, the carrier network 106 includes a Software Defined Network (SDN) controller or master 122. The SDN controller 112 is in communication with other SDN network elements, referred to as Mobile Back-End as a Service (MBAS) SDN network elements 124a, 124b (generally 124). It is envisioned that an SDN master controller 122 implemented in the carrier premises 106 manages relationships between the MBAS SDN element 124 and various MBAS SDN-e elements 140 residing in enterprise customer premises 102. The MBAS SDN elements 124 allow for implementation of a software implementation of network elements that can be created either as a pre-defined software resource or created dynamically in response to changing network conditions. The MBAS SDN elements 124 can serve as a front end to the core network devices, such as the LTE gateways. In some embodiments, the MBAS SDN element 124 works in conjunction with a software client residing in mobile devices 104. The purpose of the mobile client would be to interface with the MBAS SDN element 124 and issue requests for backend data services. In at least some embodiments, the MBAS SDN element 124 operates transparently to other carrier network elements as part of the LTE gateway 120. The MBAS SDN element 124 can work in close linkage with a corresponding MBAS SDN network element or gateway 230 residing in the enterprise network or the cloud service provider 202.

The SDN controller 122 can be a stand-alone processor, such as a server, an element of a blade processor, or a portion of an existing processor. The MBAS SDN network elements 124 can be hosted on the same processing platform as the SDN controller 122, and/or on another processing platform. One or more of the MBAS SDN network elements 124 and/or the SDN controller can be in communication with storage 126 and/or a knowledge engine 128. The knowledge engine can be implemented as an Artificial Intelligence (AI) engine 128. The AI engine 128 includes or otherwise has access to a memory cache 129.

The AI engine 128 supports the MBAS SDN element 124 and provides an ability to learn and anticipate data requests. In some embodiments, previously processed requests can be cached and used in subsequent queries in a predictive manner. For example, if a mobile user requests services, such as reports according to a particular schedule, the AI engine 128 can determine particulars related to the report and/or the schedule. The AI engine 128, in cooperation with the MBAS SDN element 124 can issue a request in anticipation of a request not yet received from the mobile user. Replies or reports resulting from such anticipatory requests can be sent, e.g., pushed to the mobile device in an unsolicited manner. Alternatively or in addition, the unsolicited results/reports can be stored, e.g., at the storage 126 and a notification sent to the mobile device. The notification can be any suitable mode, including an SMS message, an MMS message with a link to the stored results/reports, an email message, a phone call, e.g., with a pre-recorded voice message, or voice message synthesize from text to information the user of the mobile device 104 that the results are available.

The data centers 102 can belong to an enterprise organization, such as a business or other institution. Alternatively or in addition the data centers 102 can belong to a third party, such as a cloud service provider, e.g., Google®. Each of the data centers 102 can include a server 130a, 130b (generally 130), referred to as a back-end or cloud server, and storage 132a, 132b (generally 132) accessible to the server(s) 130. The server(s) 130 can host one or more services under what is generally understood as a service-oriented architecture, e.g., the SAP Enterprise Service Oriented Architecture. The services can be offered to members, e.g., employees, of a particular enterprise, to clients or customers, to vendors or suppliers, to business partners or collaborators, and so forth. The services can be accessed in machine-to-machine transactions from within the premises of the enterprise and/or remotely at an associated network address and by way of network connectivity to the remote machine.

In the illustrative example, the mobile device 104 includes an application program or "app" 134 that may be accessed or otherwise launched by way of an icon 136 displayable on a user interface of the mobile device 104. In this example, the mobile app 134 accesses back-end services available from the back-end servers. In some embodiments, the mobile device 104 includes a resident back-end client 138 to access services offered by the back-end server(s) 130. Examples of services include business applications related to one or more of accounting, distribution, production, procurement, sales, customer service, corporate performance and governance, human resource and so on.

Consider a corporate performance application 134 requiring access to financial reports of the corporation. The application 134 can call on the back-end client 138 to initiate a machine-machine communication between the mobile device 104 and the back-end server 130*a* at the enterprise data center 102*a*. The back-end client 138 can generate a request for information and send the request to the back-end server 130*a*. The back-end server 130*a*, responsive to receiving the request, can access stored financial data from the storage 132*a*. In some embodiments, a middleware server can be used to translate or otherwise modify the request to a format appropriate for the back-end server 130*a*. The back-end server 130*a*, in turn, can produce and in at least some instances format the requested information in a report, as may be appropriate, e.g., for the particular application 134.

In the previous example, communications between the mobile device and the back-end server rely on a client-server model that can include a middleware server, as may be required. Particulars of the request and the returned information or reports can be managed by the client-server arrangement. Namely, knowledge of particular request, formats and so on are generally identified beforehand. The back-end client 138 can prepare requests and replies according to requirements of one or more of the application 134, the middleware servers (when provided), and the back-end server 130*a*. In such instances, the carrier network 106, an particularly the core network 112 largely relay messages between the mobile device 104 and the enterprise data center 102*a*. It is conceivable that for a large, e.g., national carrier, the number of enterprise data centers can be in the hundreds or greater. Consider at least 500 such data centers 102, one enterprise data center 102 for each of the Fortune 500 companies.

Beneficially, the MBAS SDN element(s) 124 are resident at the carrier network premises and therefore closely and reliably accessible to elements of the carrier network, such as the gateways of the core network 112. Accordingly, communications between the MBAS SDN elements 124 and the locally accessible gateways of the core network 112 can be reliably and securely accomplished by low level interfaces. For example, the interfaces can be accomplished by one or more of layers 1-4 of the OSI model, without requiring layers 5-7. Alternatively, or in addition, the MBAS SDN elements 124 and the locally accessible gateways of the core network 112 can communicate over other low-level interfaces including proprietary interfaces that may include limited or no error detection and/or error correction. The interfaces may include limited or no security, as such security would not be necessary considering the MBAS SDN elements 124 are under the direct control of the carrier, e.g., located on secure carrier premises. Such low-level interfaces can simplify protocol stacks and associated network communications.

In the illustrative embodiment, the MBAS SDN element(s) 124 can initiate a logical network path to equipment at the enterprise data center(s) 102, such as the back-end server(s) 130. Such logical network paths can be pre-configured, e.g., during provisioning. Alternatively or in addition, the logical network paths can be added, deleted and/or reconfigured on-the-fly. Such an adaptive nature of the logical network allows the carrier network to adjust the logical network paths as may be necessary to respond to changing network conditions. Further, by using logical network elements 124, the provisioning of network paths can be accomplished without regard to the underlying physical network connections. This allows the carrier to adjust the network in an ad hoc or reactive manner.

In some embodiments, the mobile device is not equipped with nor does it require the back-end client 138. Rather, the MBAS SDN element(s) 124 at the core network 112 is configured to receive request directly from the application 134. These can include requests directed from the application 134 and/or from a user of the mobile device 104 by any suitable means, such as text messages through SMS or text/multimedia messages through MMS. The MBAS SDN element(s) 124 can receive supplemental information from the message itself and/or from the carrier.

The supplemental information an include one or more of identities of the mobile device 104, a user of the mobile device 104, the application 134, the enterprise data center 102, the back-end server 130, a service requested from the back-end server 130, and so on. The supplemental information can be obtained from the message, e.g., in a header portion. Alternatively or in addition, all or a portion of the supplemental information can be provided by the carrier. Such carrier-provided information can include network information, such as one or more of statistics, capacity, billing, as a real time value based on current conditions. It is also envisioned that the network information can include historical information, e.g., past usage, and/or predictive information, such as expected outages, limitations to bandwidths, changes in billing rates, and so on.

The MBAS SDN network element(s) 124 can exchange messages between itself and the back end server(s) 130 without modification. Alternatively or in addition, the MBAS SDN network element(s) 124 can intercept such messages, translate and/or reformat, as may be required. Thus, an application might use a particular set of commands that are not recognizable or otherwise serviceable directly by the back-end server.

An example includes an SMS message typed by a user: "provide second quarter financials." This SMS message could be relayed directly to the MBAS SDN via another network entity, such as Short Message Peer-to-Peer (SMPP) gateway. The MBAS SDN 124*a* might receive this message directly, e.g., by a user sending it via SMS addressed to a short code identifying one of the SDN controller 122 and/or the MBAS SDN 124*a*. It is envisioned that the MBAS SDN element 124 is supported by a large set of catalogs and databases, which would contain records, such as records of mobile clients, requests, associated databases and location of MBAS SDN-e elements 140. For example, the MBAS SDN element 124 can be supported by a security catalog, which would enable the MBAS SDN element 124 to restrict usage and assign privileges to individual requests based on pre-provisioned parameters. The MBAS SDN 124*a* has access to stored information 126 and/or the AI engine 128. The MBAS SDN 124*a* can be programmed to directly translate message, for example, according to a look up table as might be stored in the local storage 126. Alternatively, some degree of interpretation may be necessary. An interpretive feature is advantageous, particularly for such free-form messages as those provided by email, SMS, MMS and so on.

According to generally well understood techniques, such free form messages can be parsed according to one or more of a grammar and a dictionary. The parsed message in whole or in part can be interpreted and translated or otherwise used to generate another message. The other message is destined for the target back-end server 130a and subscribes to grammars, semantics, and/or syntax as may be required by applications serviced by the back-end server 130a. Certain words, e.g., those related to a particular application, such as finance, governance, human resources can be used to identify one or more of the particular back-end server 130a or back-end service of multiple services hosted by the server 130a to receive the message. Such partial identifications can be used to facilitate interpretation.

For example, having determined that the message relates to financial services can reduce the set of possible messages available by a financial back-end service. Other message content, such as date(s), amount(s), entities, formats, and so on can be interpreted. The MBAS SDN 124a and/or the SDN controller 122 can translate the message, e.g., the SMS text message, to a translate message suitable for the intended back end service. Other information, such as an identity of the mobile user and/or mobile device can be used to identify the particular enterprise data center 102a and/or the particular back-end server 130a or back-end service sought.

In some embodiments, one or more of the enterprise data centers 102 include a software defined network element 140a, 140b (generally 140). In particular the software defined network element is in communication with the mobile back-end server 130a and referred to as a Mobile Back-End as a Service, Software Defined Network enterprise (MBAS SDN-e) element 140. The MBAS SDN-e element 140 can be hosted on a dedicated processor, such as a server or gateway at the enterprise data center 102. Alternatively, the MBAS-SDN element 140 can be hosted on an existing processor, e.g., supporting other activities at the enterprise data center 102. It is envisioned that the MBAS-SDN element 140 can include one or more Application Programming Interfaces (APIs) 142a, 142b (generally 142) as may be necessary to support interaction with those back-end services made available to the mobile user. The MBAS SDN-e elements 140 can receive requests from the carrier MBAS SDN element 124 and interface via API's 142 with the backend data sources 130 such as Oracle databases. An MBAS SDN-e element 140 residing in the enterprise network or cloud services provider 102 can be implemented as a standalone gateway or as part of a router or additional gateways. It is also envisioned that the MBAS SDN-e element 140 residing in the enterprise network 102 can be implemented as part of a MADP/MEAP gateway as software defined network element. When present, the MBAS-SDN-e element 140 at the enterprise data center 102 communicates with the MBAS SDN element 124 at the core network 112 by way of the logical network connection established between the two devices 140, 124.

Figure 2:
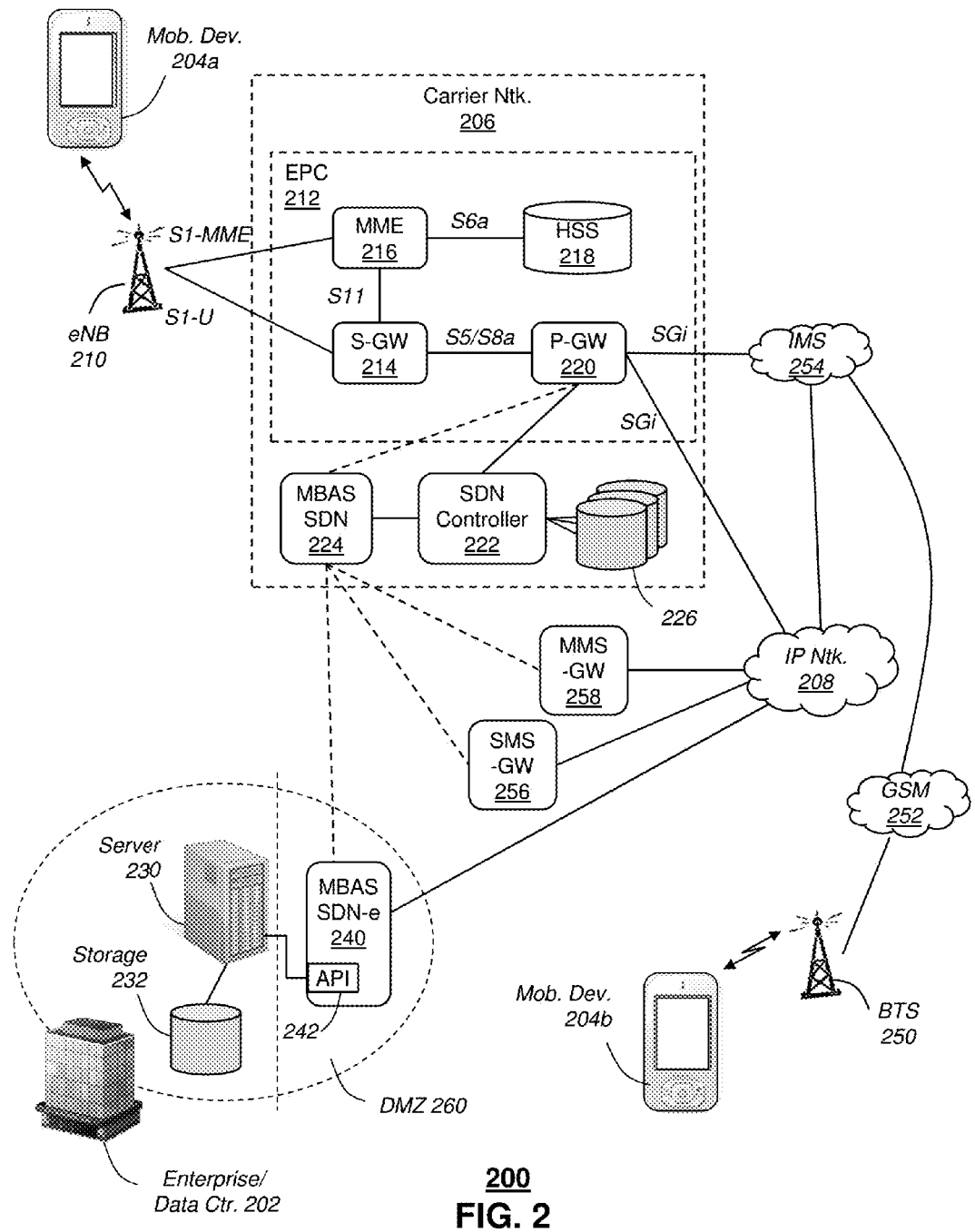
FIG. 2 depicts another illustrative embodiment of a communication system that provides a backend-as-a-service, software defined network element.

FIG. 2 another illustrative embodiment of a communication system 200 that provides a backend-as-a-service, software defined network element. The system 200 supports mobile access to remote, back-end services hosted by one or more data centers 202. A first mobile device 204a accesses the back-end services by way of a network infrastructure. In the illustrative example, the network infrastructure includes a carrier network 206 in communication with the data center 202 by way of an internet protocol (IP) network 208. The first mobile device 204a accesses the carrier network 206 by way of a radio terminal, such as an enhanced Node B (eNB) 210.

The carrier network 206 includes a core network 212, e.g., of an LTE network. The core network 212 includes one or more network elements, such as an S-GW 214, an MME 216, an HSS 218 and a P-GW 220 as shown. The eNB 210 is in communication with the MME 116, which generally handles control plane activity and the S-GW 224 in further communication with the P-GW 220, which generally handle user or data plan activity. Information packets are routed between the P-GW 220 and one or more other networks, such as the IP network 208, an IMS network 254 and/or GSM network 252. In the illustrative example, a second mobile device 204b communicates with the GSM network 252 by way of a base transceiver station 250. One or more of the GSM network 252 and the IMS network 254 can be in communication with the carrier network 206 by a direct connection, e.g., by way of the P-GW 220, or indirectly, by way of another network, such as the IP network 208.

Also shown are an SMS gateway 256 and an MMS gateway 258 for passing SMS and/or MMS network messages according to generally well understood techniques. Since the MBAS SDN element 224 resides in the carrier network 206, it is envisioned that the MBAS SDN element 224 can interface with other carrier network elements such as the SMS gateway 256 and MMS gateway 258. The MBAS SDN element 224 can have the ability to integrate mobile device requests with other sources of data such as the SMS and MMS gateways 256, 258. One of the SMS gateway 256, the MMS gateway or both can be in communication with the carrier network 206, and particularly with an MBAS SDN element 225 operated by the carrier network 206. Such network paths between the MBAS SDN element 225 and the mobile devices 204a, 204b (generally 204) allows SMS and/or MMS message to be directed from the mobile device(s) 204 directly to the MBAS SDN element 224. Once again, this can be accomplished by a destination address, such as a short code, a telephone number, or an internet address.

The SMS and/or MMS messages, once received by the MBAS SDN element 224 can be processed as described above. That is, the messages can be translated, as required, with the translated message being directed from the MBAS SDN element 224 to a back-end server 230 by way of a middleware server, or without such a middleware server. The ability to service data requests issued by mobile devices 204 without the need of a middleware gateway and/or without the need of a mobile client. In some embodiments, the enterprise data center includes an MBAS SDN-e element 240 in network communication with the MBAS SDN element 224 of the carrier by way of a logically defined network. The logically defined nature, along with application of generally well-understood software defined network techniques allows all of the advantages and flexibility disclosed above in reference to FIG. 1.

Messages received from the mobile device(s) 204 at the MBAS SDN 224 result in one or more reply message(s) directed from the back-end server, e.g., by way of the MBAS SDN-e element 240, to the MBAS SDN 224 by way of the logical network. The MBAS SDN 224 can forward the reply message(s) to the corresponding mobile device(s) 204. In some embodiments, messages sent by the mobile device 204 by way of SMS and/or MMS messaging services generate reply messages in a like manner Namely, an SMS request message can result in an SMS reply message. Likewise, an MMS request can result in an MMS reply. However, in some instances, a simple request message can result in a requested service that requires features not available to the source messaging service.

Consider an SMS message request for a financial report. The request might be a simple text phrase, e.g., "get 2013 financial report." The result however, might be inappropriate for SMS for any of various reasons. The result may be lengthy and exceed message lengths. The results might contain special formatting and/or graphics that are not well suited to the messaging service used in the request. In such instances, one of the MBAS SDN-e element 242, the MBAS SDN 224 element 224, the SDN controller 222 or another processor, such as the AI engine 128 (FIG. 1) can compare the requesting message service or format and identify a suitable reply service or format. In the simple SMS request resulting in a length, complex result with special formatting and graphics, the MBAS SDN-e element 242, the MBAS SDN 224 element 224, the SDN controller 222 or another processor can determine that am MMS reply would be sufficient. That is, a relatively short message indicating that a reply is present, along with a pointer, such as an HTTP or web address to the resulting report. The web report can be sent from the back-end server 230 to a web server, e.g., in a DMZ 260 of the enterprise data center or some other location, such as an Internet and/or cloud service provider. Selection of the link provided in the SMS reply message will direct the mobile device 204 to the appropriate HTTP document or web page to view results.

Alternatively or in addition, results can be provided by other modes, such as by an email. The email address of the recipient, e.g., a user of the mobile device 204, can be provided according to records of the enterprise organization, the carrier, or within the message itself, e.g., during a translation. If it is recognized during a translation that the originating message format or service would be insufficient or otherwise inadequate for a reply, the MBAS SDN 224 can include such information within the translated message. That is, the translated message might simply identify a mode for providing the requested service according to a user preference, an enterprise preference, best practices, and so on. In this instance, the MBAS SDN-e element 240 receives the translated reply and notification as to which mode should be used in providing the requested service.

Figure 3:
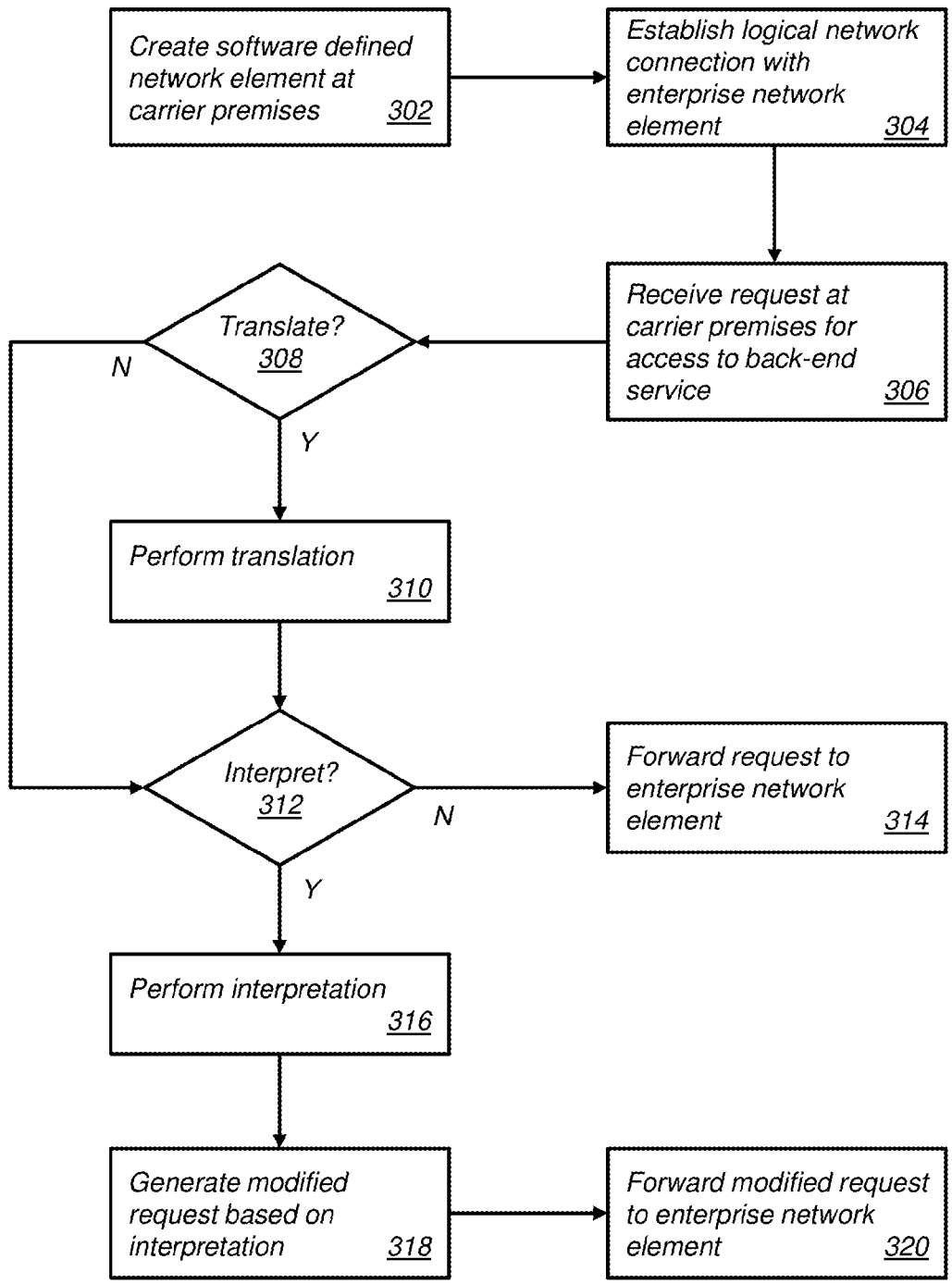
FIG. 3 depicts an illustrative embodiment of a method used in portions of the system described in FIGS. 1 and 2.

FIG. 3 depicts an illustrative embodiment of a process 300 used in portions of the system described in FIGS. 1-2 and 4-5. A software-defined network element is created at a carrier network facility at 302. For example, the MBAS SDN element 124a can be created on a processor at carrier network premises housing the core network 112. A logical network connection between the software-defined network element at the carrier network facility and a network entity in local communication with a remotely accessible system at 304. The logical network connection can be established between the MBAS SDN 124a at the carrier network premises and the MBAS SDN-e element 140a at the enterprise organization premises, such as the enterprise data center 102a. The logical network can be established using generally well understood techniques related to software defined networks. In other embodiments, the logical network can be established between the MBAS SDN element 124a and a middle ware server, a dedicated network element, such as a router, a switch or a gateway in network communications with the back-end server 130a.

A request is received at the software-defined network element of the carrier network facility at 306. For example, a request from the mobile device 104 in the form of a request message is directed to a network address of the MBAS SDN element 124a. By its close association and colocation with the core network 112, the message received by way of the core network 112 can be directed to the MBAS SDN element 124a by way of a low-level interface. That is, a low-level interface of one of the core network gateways, such as the P-GW 120. The low-level interface alone or in combination with a close network association provided by the network communications established between the MBAS-SDN element 124a and the MBAS SDN-e element 140a generally result in efficient, reliable and secure delivery of back-end enterprise services to mobile users.

In some embodiments, a determination is made at 308, whether the received request requires translation at 308. In some instances, the mobile application 134 provides the request message in a suitable format, e.g., with proper grammar, syntax and so forth. For example, translations may not be required if the mobile device 104 includes a back-end client 138 that is pre-configured to issue request for back-end services in a suitable formats. In such instances, a translation would not generally be required. In other instances, e.g., when the mobile device is not configured with the back-end client 128, at least some degree of translation may be required. One of the SDN controller 122, the MBAS SDN 124a or both can be configured to determine whether a translation is required. Such determinations can be made according to one of a message header, a message syntax, a message grammar or lack thereof, and so forth. To the extent that translation is required, the translation is performed at 310.

Whether the request is translated or not, a determination is made next as to whether the message requires interpretation at 312. One of the SDN controller 122, the MBAS SDN 124a or both can be configured to determine whether an interpretation is required. Such determinations can be made according to one of a message header, a message syntax, a message grammar or lack thereof, and so forth. To the extent that the message does not require interpretation, the message is forwarded to the enterprise network element at 314.

To the extent the message requires interpretation, interpretation is performed at 316. Interpretations can be performed by one or more of the MBAS SDN element 124a, the SDN controller 122, the AI engine 128 or a combination thereof. Interpretations can be used to facilitated establishing one of a target enterprise, a target back-end service, a recipient address, an identity of the mobile device 104 and/or the user of the mobile device 104. Alternatively or in addition, interpretations can be used to identify details associated with a requested service, such as a time periods, associated parties, requested report(s), formats of such reports, and so on. A modified request is generated based on the interpretation at 318, and the modified request is forwarded to the enterprise network element at 320.

Figure 4:
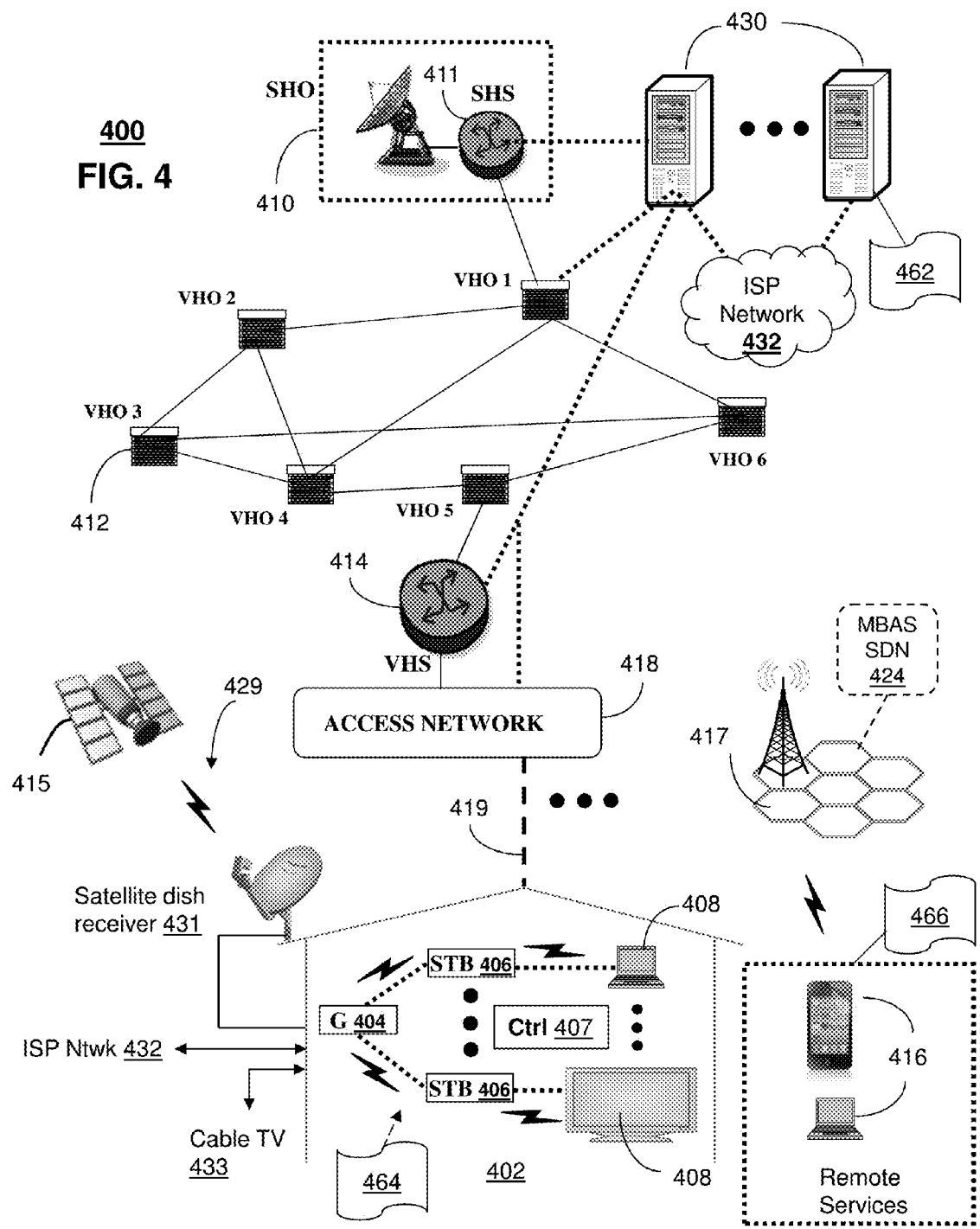
FIGS. 4-5 depict illustrative embodiments of communication systems that provide media services and incorporating a backend-as-a-service, software defined network element.

FIG. 4 depicts an illustrative embodiment of a first communication system 400 for delivering media content. The communication system 400 can represent an Internet Protocol Television (IPTV) media system. Communication system 400 can be overlaid or operably coupled with the communication systems 100, 200 of FIGS. 1 and/or 2 as another representative embodiment of communication system 400. For instance, one or more devices illustrated in the communication system 400 of FIG. 4 can create a software defined network element in local communication with a gateway of a service-provider network. Establishment of a first logical network connection can be facilitated between the first software defined network element and another network element in local communication with a remotely accessible back-end system. A request from a communication device for access to a service of the remotely accessible system is received and forwarded to the other network element by way of the first logical network connection. The other network element forwards the translated request to the back-end system.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a software-defined network server (herein referred to as SDN server 430). The SDN server 430 can use computing and communication technology to perform function 462, which can include among other things, techniques described by method 300 of FIG. 3. That is, the SDN server 430 can host the MBAS SDN 124, 224 of the carrier network. For instance, function 462 of server 430 can be similar to the functions described for one or more of the MBAS SDN element 124, 224 or the SDN controller 122, 222 of FIGS. 1 and 2 in accordance with method 300. The media processors 406 and wireless communication devices 416 can be provisioned with software functions 464 and 466, respectively, to utilize the services of software-defined network server 430. For instance, functions 464 and 466 of media processors 406 and wireless communication devices 416 can be similar to the functions described for the communication devices 104, 204 of FIGS. 1 and 2 in accordance with method 300.

In some embodiments, the SDN server 430 can host the MBAS SDN-e element 140, 240 of the enterprise data center 102, 202. In such instances, establishment of a logical network connection can be facilitated between the MBAS SDN element 424 (shown in phantom) of the mobility network 417 servicing mobile devices 416.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
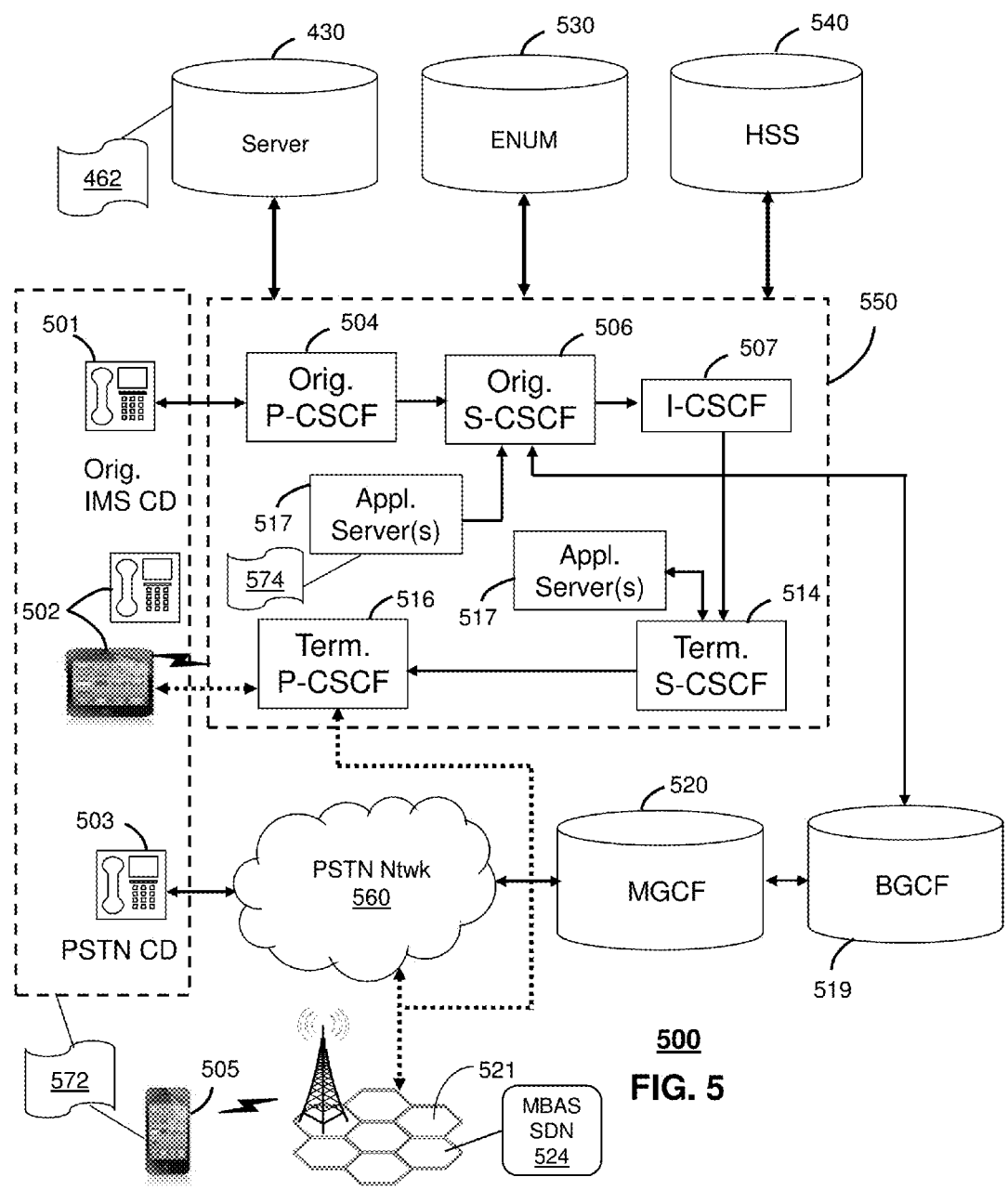

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100, 200 of FIGS. 1 and/or 2 and communication system 400 as another representative embodiment of communication system 400. A software defined network element can be generated in local communication with a gateway of a carrier network. Establishment of first logical network connection can be facilitated between the first software defined network element and another network element in local communication with a remotely accessible back-end system. A request from a communication device for access to a service of the remotely accessible system is received and forwarded to the other network element by way of the first logical network connection. The other network element forwards the translated request to the back-end system.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The software-defined network server 430 of FIG. 4 can be operably coupled to communication system 500 for purposes similar to those described above. The software-defined network server 430 can perform function 462 and thereby provide access to back-end services to the CDs 501, 502, 503 and 505 of FIG. 5 similar to the functions described for SDN controller 124, 224 of FIGS. 1 and/or 2 in accordance with method 300 of FIG. 3. CDs 501, 502, 503 and 505, which can be adapted with software to perform function 572 to utilize the services of the software-defined network server 430 similar to the functions described for the mobile device 104, 204 of FIGS. 1 and/or 2 in accordance with method 300 of FIG. 3. The software-defined network server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
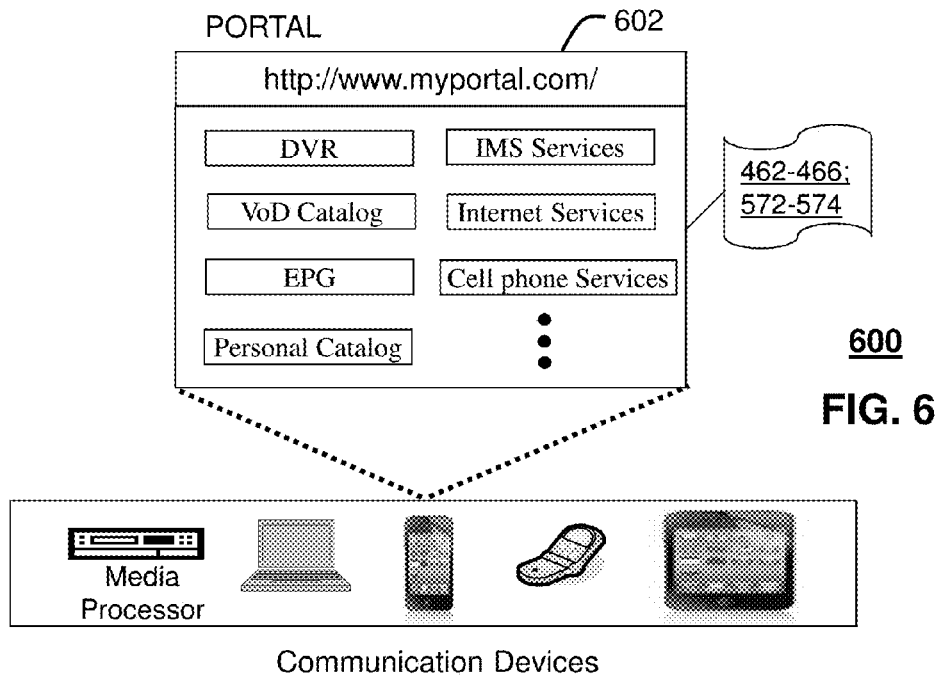
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with the systems 100, 200 of FIGS. 1 and/or 2, communication system 400, and/or communication system 500 as another representative embodiment of systems 100, 200 of FIGS. 1 and/or 2, communication system 400, and/or communication system 500. The web portal 602 can be used for managing services of systems 100, 200 of FIGS. 1 and/or 2 and communication systems 400-500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200 of FIGS. 1 and/or 2, and communication systems 400-500. For instance, users of the services provided by the software-defined network controller 122 or software-defined network server 430 can log into their on-line accounts and provision the servers 122 or server 430. The users can provide information, such as personal identity information, equipment identification, security information, target back-end services, anticipated requested services, such as particular reports, formats, data sources, and so on. Service providers can log onto an administrator account to provision, monitor and/or maintain the systems 100, 200 of FIGS. 1 and/or 2 or the software-defined network server 430.

Figure 7:
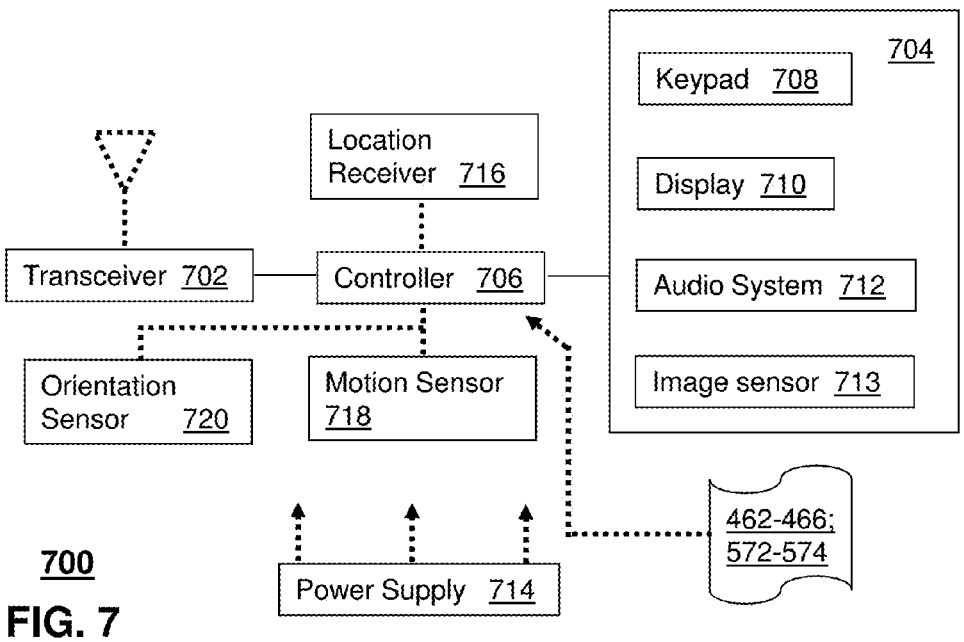
FIG. 7 depicts an illustrative embodiment of a communication device of the communication systems of FIGS. 1-2, and 4-5.

FIG. 7 depicts an illustrative embodiment of a communication device 700. Communication device 700 can serve in whole or in part as an illustrative embodiment of the devices depicted in FIGS. 1 and/or 2, and FIGS. 4-5. Communication device 700 in whole or in part can represent any of the communication devices described in FIGS. 1-2 and 4-5, and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2, communication systems 400-500 of FIGS. 4-5 such as a gaming console and a media player.

The communication device 700 shown in FIG. 7 or portions thereof can serve as a representation of one or more of the devices of system of FIGS. 1 and/or 2, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, the software defined network elements disclosed herein can be applied to stationary communication devices, such as desktop computers, media processors, circuit-switched communication devices, and so forth. Still other applications include the SDN controller 122, 222 coordinating or otherwise managing message traffic between a multitude of MBAS SDN elements 124, 224 and a multitude of cloud service providers or enterprise data centers. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
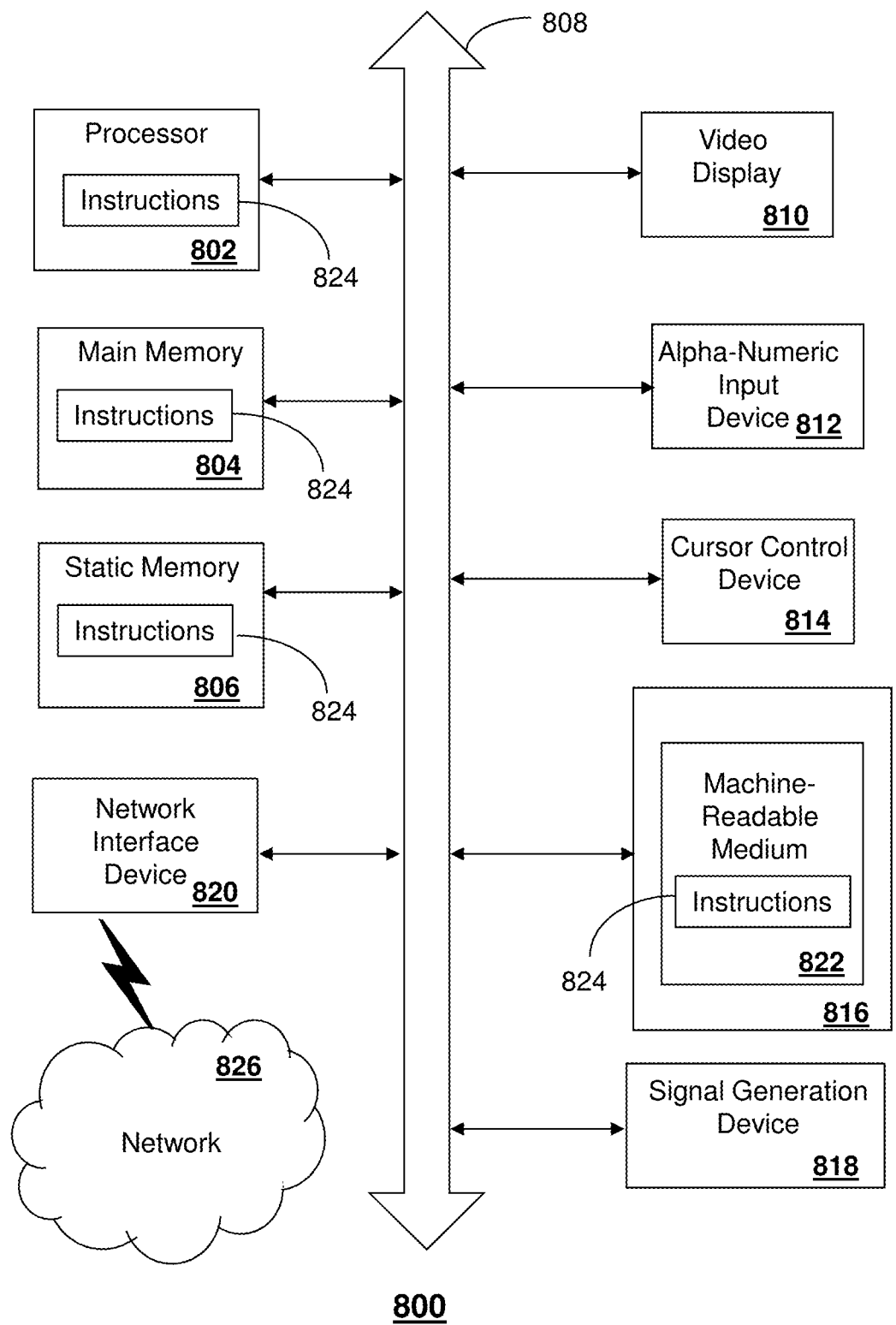
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the software-defined network server 430, the media processor 406, the back-end servers 130, 230, 124, 224, the AI processor 128, the communication devices 104, 204, any of the core network devices, such as the MME 116, 216, the HSS 118, 218, the S-GW 114, 214, and the P-GW 120, 220 and other devices of FIGS. 1-2 and 4-8. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

It is appreciated that implementation of the techniques disclosed herein, such as the MBAS SDN elements 124, 224, 140, 240 allow the network carrier to implement services that are generally not currently available. Such services are likely to disrupt the mobile application market with respect to how back-end services are implemented. It is also envisioned that a carrier offering the types of features disclosed herein can generate a revenue stream. Revenue can be obtained from merely hosting the MBAS SDN elements 124, 224, to message processing, storage, automatic reporting, personalization features, and so on. Such revenue could be obtained from cloud service providers, enterprise customers and/or end users.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A device comprising:
a processing system including a processor; and
a memory that stores executable instructions that, when executed by the processing system, facilitate performance of operations, the operations comprising:
facilitating a first logical network connection between a first network element in local communication with a gateway of an evolved packet core of a long-term evolution network and a second network element in local communication with a remotely accessible system;
detecting a request for access by a mobile device to an application of the remotely accessible system, wherein the request is received from the gateway of the evolved packet core by way of a low-level interface of the gateway; and
forwarding the request to the second network element by way of the first logical network connection, wherein the second network element forwards the request to the remotely accessible system.

2. The device of claim 1, wherein receiving the request comprises receiving a text message by way of a short message service directed to the first network element, and wherein the operations further comprise:
interpreting the text message to generate an interpretation of the text message;
identifying the remotely accessible system based on one of an identity of the mobile device, the interpretation of the text message or both; and
identifying the second network element based on the remotely accessible system.

3. The device of claim 2, wherein the operations further comprise:
receiving, by way of the first logical network connection, a reply from the remotely accessible system, wherein the reply is generated responsive to receipt of the request by the remotely accessible system; and
forwarding the reply to the gateway of the evolved packet core for delivery to the mobile device by way of the long-term evolution network.

4. The device of claim 3, wherein the reply is directed to the first network element, and wherein forwarding of the reply comprises forwarding the reply by way of the short message service, wherein the request initiated by the mobile device is serviced by the application of the remotely accessible system without requiring a mobile client application and without requiring a middleware server.

5. The device of claim 1, wherein the first network element comprises a first software defined network element, and wherein the operations further comprise determining from network performance information of a network carrier, a change in network conditions, wherein the first software defined network element is created dynamically in response to the determining of the change in network conditions.

6. The device of claim 1, further comprising enforcing a security protocol between the first network element and the second network element.

7. The device of claim 1, wherein the detecting of the request comprises receiving the request from the gateway of the evolved packet core by way of the low-level interface of the gateway without layers five through seven of a seven-layer open systems interconnection model, and wherein the application comprises a business application based on one of accounting, distribution, production, procurement, sales, customer service, corporate performance, governance, human resources, of any combination thereof.

8. A non-transitory, machine-readable storage medium, comprising executable instructions that, when executed by a processing system including a processor, facilitate performance of operations, the operations comprising:
facilitating a first logical network connection between a first network element in local communication with equipment of a core network of a mobility network and a second network element in local communication with a remotely accessible system;

identifying a first message comprising a request for access by a mobile device to an application of the remotely accessible system, wherein the request is received from the equipment of the core network by way of a low-level interface; and forwarding a second message comprising the request to the second network element by way of the first logical network connection, wherein the second network element forwards the second message to the remotely accessible system by way of an application programming interface.

9. The non-transitory, machine-readable storage medium of claim 8, wherein receiving the request comprises receiving the first message from a client application hosted on the mobile device, and wherein the operations further comprise:

interpreting the first message to generate an interpretation of the first message;

identifying the remotely accessible system based on one of an identity of the mobile device, the interpretation of the first message or both; and identifying the second network element based on the remotely accessible system.

10. The non-transitory, machine-readable storage medium of claim 9, wherein the operations further comprise:

receiving, by way of the first logical network connection, a reply from the remotely accessible system, wherein the reply is generated responsive to receipt of the second message by the remotely accessible system; and forwarding the reply to equipment of the mobility network to deliver the reply to the mobile device.

11. The non-transitory, machine-readable storage medium of claim 10, wherein the reply is directed to the first network element, and wherein forwarding of the reply comprises forwarding the reply by way of the client application.

12. The non-transitory, machine-readable storage medium of claim 8, wherein the first network element comprises a first network element, and wherein the operations further comprise creating the first network element during a provisioning of network service.

13. The non-transitory, machine-readable storage medium of claim 8, further comprising enforcing a security protocol between the first network element and the second network element.

14. The non-transitory, machine-readable storage medium of claim 8, wherein the identifying of the request comprises receiving the request from a gateway of the core network by way of the low-level interface of the gateway, and wherein the application comprises a business application based on one of accounting, distribution, production, procurement, sales, customer service, corporate performance, governance, human resources, of any combination thereof.

15. A method, comprising:

facilitating, by a processing system including a processor, a plurality of logical network connections between a plurality of network elements at premises of a network carrier and a plurality of network elements in local communication with a plurality of back-end servers at enterprise premises;

receiving, by the processing system, a request initiated by a mobile device serviced by the network carrier for access to an application of a particular back-end server of the plurality of back-end servers, wherein the request is received from a network element of the plurality of network elements by way of a low-level interface;

determining, by the processing system, a location of the particular back-end server of the plurality of back-end servers; and forwarding, by the processing system, the request to the network element by way of a logical network connection of the plurality of logical network connections corresponding to the location of the particular back-end server, wherein the network element forwards the request to the particular back-end server of the plurality of back-end servers.

16. The method of claim 15, wherein receiving the request comprises receiving a text message by way of a short message service directed to a particular network element of the plurality of network elements, by way of a short messages service short code, the method further comprising:

interpreting, by the processing system, the text message to generate an interpretation of the text message;

identifying, by the processing system, the location of the particular back-end server based on one of an identity of the mobile device, an identity of a user of the mobile device, the interpretation of the text message or a combination thereof; and identifying, by the processing system, the network element based on the location of the particular back-end server of the plurality of back-end servers.

17. The method of claim 16, further comprising:

receiving, by the processing system, by way of a logical network connection of the plurality of logical network connections, a reply from the particular back-end server of the plurality of back-end servers, wherein the reply is generated responsive to receipt of the request by the particular back-end server of the plurality of back-end servers; and forwarding, by the processing system, the reply to equipment at the premises of the network carrier to deliver the reply to the mobile device.

18. The method of claim 16, wherein the particular network element comprises a particular software defined network element, the method further comprising:

determining, by the processing system, a change in network conditions; and creating, by the processing system, the particular software defined network element of the plurality of network elements being created dynamically in response to the determining of the change in network conditions.

19. The method of claim 17, wherein the reply is directed to the particular network element of the plurality of network elements, and wherein forwarding of the reply comprises forwarding the reply by way of the short message service, wherein the request initiated by the mobile device is serviced by the particular back-end server of the plurality of back-end servers without requiring a mobile client application and without requiring a middleware server.

20. The method of claim 15, wherein the receiving of the request comprises receiving the request from a gateway of the premises of the network carrier by way of the low-level interface of the gateway, and wherein the application comprises a business application based on one of accounting, distribution, production, procurement, sales, customer service, corporate performance, governance, human resources, of any combination thereof.

* * * * *

UNITED STATES PATENT AND TRADEMARK OFFICE
CERTIFICATE OF CORRECTION

PATENT NO. : 9,985,881 B2
APPLICATION NO. : 15/434219
DATED : May 29, 2018
INVENTOR(S) : Arturo Maria It is certified that error appears in the above-identified patent and that said Letters Patent is hereby corrected as shown below:

In the Claims

Column 24, Line 40, delete "16" and insert --17--; and
Column 24, Line 49, delete "17" and insert --16--.

Signed and Sealed this
Second Day of October, 2018

Andrei Iancu
*Director of the United States Patent and Trademark Office*